United States Patent Office 3,574,556
Patented Apr. 13, 1971

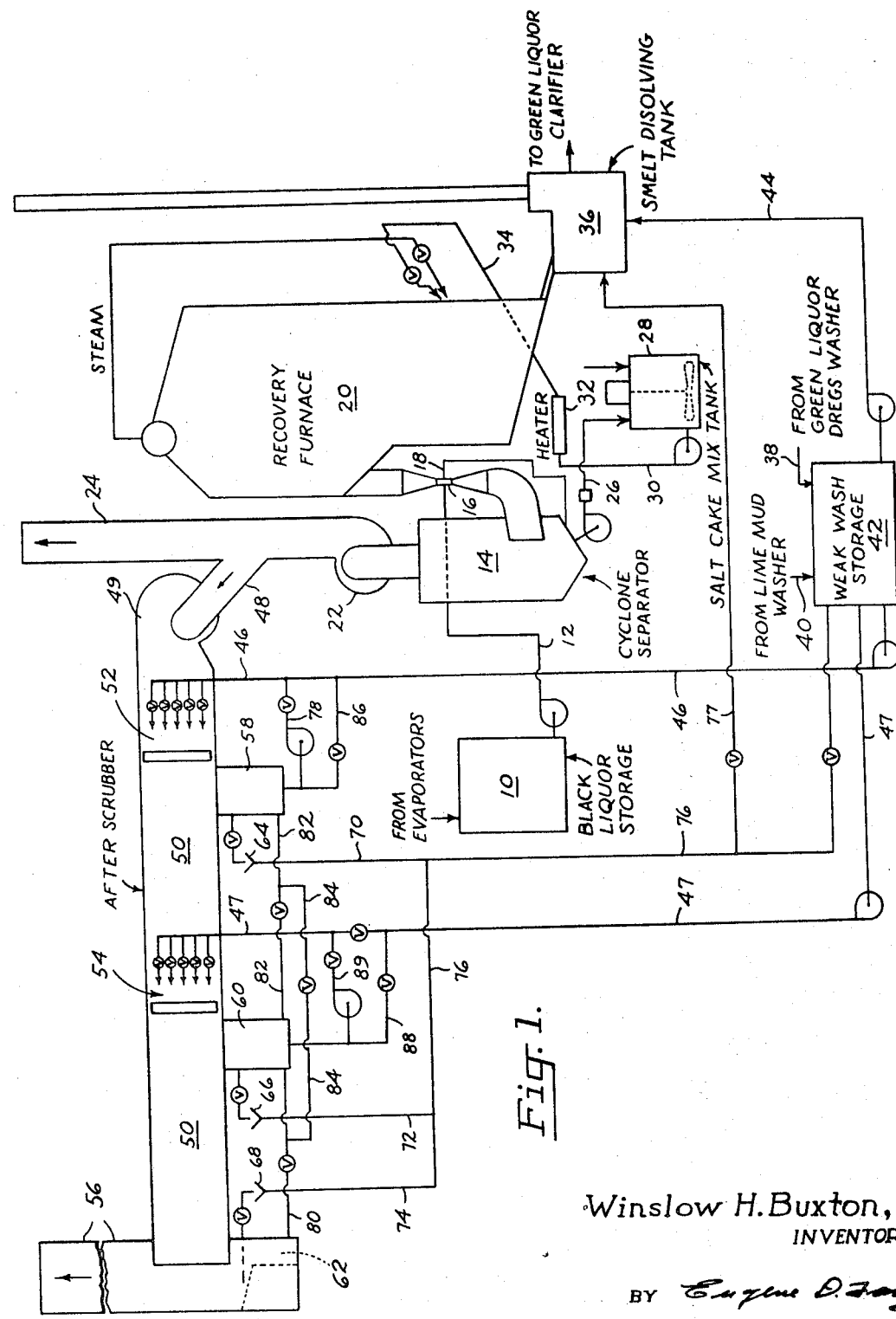

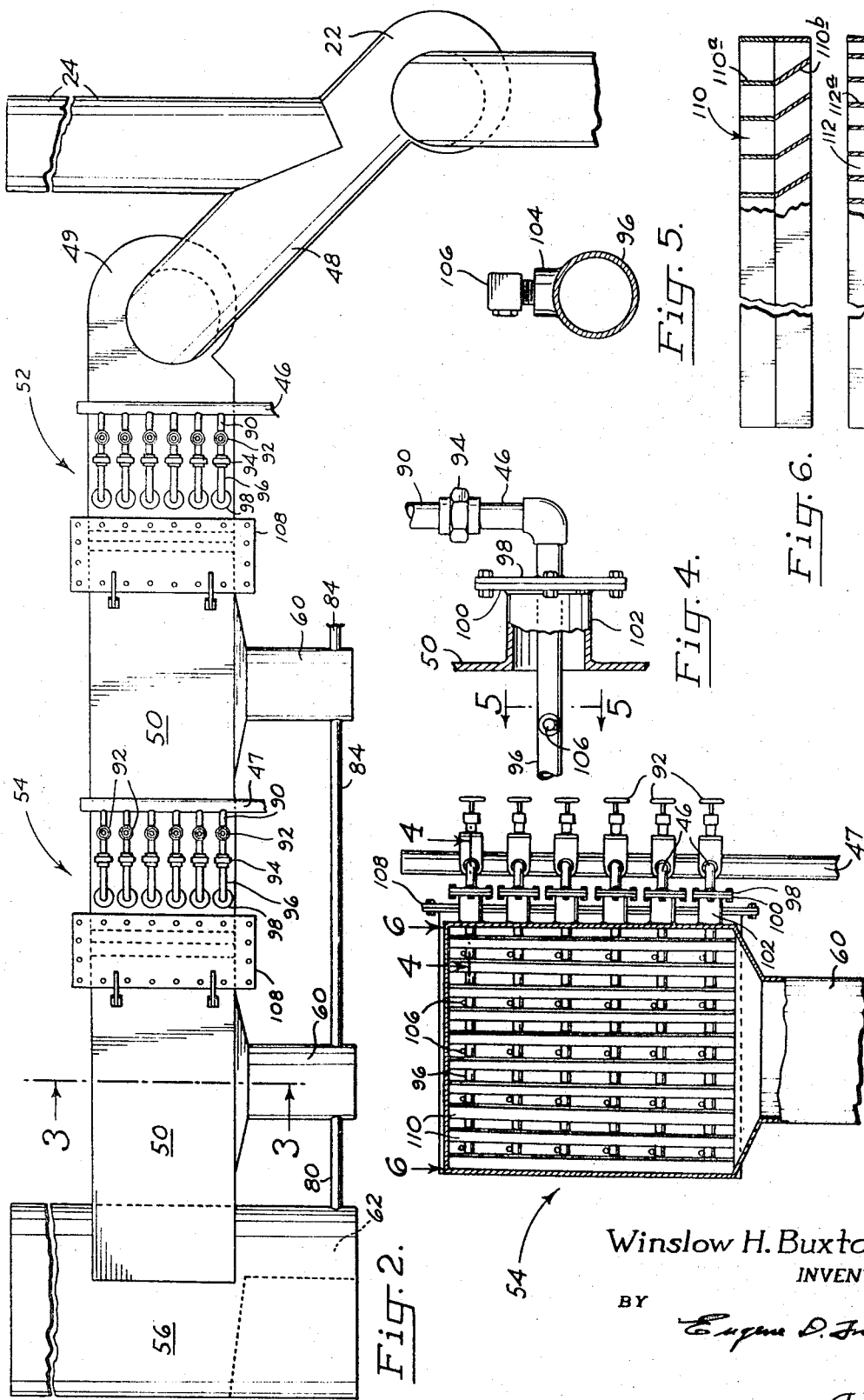

3,574,556
PROCESS AND APPARATUS FOR KRAFT PULP MILL CHEMICAL RECOVERY AND ODOR ABATEMENT
Winslow H. Buxton, Jr., Albany, Oreg., assignor to Western Kraft Corporation, Albany, Oreg.
Original application Apr. 19, 1965, Ser. No. 449,102, now Patent No. 3,431,165, dated Mar. 4, 1969. Divided and this application May 15, 1968, Ser. No. 739,961
Int. Cl. C10b
U.S. Cl. 23—262
8 Claims

ABSTRACT OF THE DISCLOSURE

Apparatus is incorporated in a kraft pulp mill for diverting the gases from the discharge stack of the recovery furnace to an afterscrubber in which the gases are sprayed with the alkaline weak wash liquor resulting from the washing of calcium carbonate mud and solid dregs produced by causticizing the green liquor, to remove the malodorous constituents and recover solid chemical values before venting the gases to the atmosphere.

---

This is a division of application Ser. No. 449,102 filed Apr. 19, 1965 now U.S. Pat. No. 3,431,165 for Process and Apparatus for Kraft Pulp Mill Chemical Recovery and Odor Abatement.

This invention relates to process and apparatus for the recovery of chemicals and the abatement of odors emitted by the recovery furnace of kraft pulp mills. It pertains further to a novel gas scrubbing apparatus, termed herein an "afterscrubber," which receives the gases discharged from a kraft pulp mill recovery furnace and scrubs them with an alkaline solution derived from the mill operations for the recovery of chemicals and removal of odorous compounds, the recovered chemicals then being recycled to the plant flow.

It is the general object of the present invention to provide chemical recovery and odor abatement process and apparatus for use on a kraft recovery furnace, which process and apparatus:

(1) Efficiently remove and recover for subsequent use in the pulping process small particles of solid chemicals which otherwise would be lost to the atmosphere.

(2) Efficiently remove from the recovery furnace exhaust gases, hydrogen sulfide, mercaptans and other malodorous gaseous compounds which otherwise would escape to the atmosphere and create a nuisance.

(3) Use liquor available in the mill chemical streams as a wash liquor for removing the solid and gaseous materials.

(4) Recycle the recovered chemicals to the plant process with economic gain and without interfering with the material balance of the plant.

(5) Recover heat.

(6) Minimize corrosion.

(7) Do not create a problem of waste disposal in the mill effluent streams.

To orient the presently described chemical recovery and odor abatement process and apparatus:

In the classic kraft pulping procedure, wood or other lignocellulose is coked at elevated pressure with aqueous sodium sulfide-caustic soda cooking chemicals. At the end of the cook the mixture of pulp and black liquor, which contains the spent cooking chemicals and lignin, is diluted and separated into its pulp and black liquor components. The pulp is washed and sent to the bleach plant or paper mill. The black liquor is processed for the recovery of pulping chemicals and for the utilization of its fuel content.

First, the black liquor is concentrated and burned in the recovery furnace. The heat from the furnace is utilized to generate steam. The stack gases pass through a steam atomized venturi scrubber and a cyclone separator and are discharged to the atmosphere.

The chemical content of the burned black liquor is contained in the molten smelt discharged from the furnace. The smelt is dissolved in mill wash solutions to form a green liquor containing principally sodium sulfide, sodium sulfate and sodium carbonate. For re-use in the mill processes, the green liquor is causticized by adding slaked lime which converts the sodium carbonate to caustic soda, contemporaneously forming a mud of calcium carbonate.

The caustic soda solution is applied to the pulping operations of the mill. The calcium carbonate mud is burned in a kiln to regenerate calcium oxide which is slaked and applied to the causticizing of a further quantity of green liquor.

In the foregoing sequence, the calcium carbonate mud is washed with water to recover chemicals, forming a weak alkaline solution called "weak wash." Also, the green liquor is processed for the separation of solid dregs which are washed with water for the recovery of chemicals, forming a further quantity of alkaline weak wash liquor.

The weak wash liquor may be defined as an alkaline, sodium salt-containing aqueous liquor having a solids content of from 20–30% by weight and a pH of from 10–14. The solids comprise principally sodium sulfide, sodium hydroxide and sodium carbonate in the following approximate proportions, expressed in percent by weight of the total solids:

Sodium sulfide _____ 15–25
Sodium hydroxide _____ 50–75
Sodium carbonate _____ 10–20

The weak wash liquor is used for the purposes of the present invention in washing the recovery furnace stack gases in a manner which now will be described with particular reference to the drawings wherein:

FIG. 1 is a schematic flow diagram of part of the chemical recovery plant of a kraft pulp mill, illustrating the manner of application of the herein described chemical recovery and odor abatement apparatus;

FIG. 2 is a view in side elevation of a gas scrubbing unit employed for scrubbing the gases emitted by the recovery furnace of the mill;

FIG. 3 is a transverse sectional view of the gas scrubbing unit taken along line 3—3 of FIG. 2;

FIG. 4 is a detail view partly in elevation and partly in section, taken along line 4—4 of FIG. 3, and illustrating the manner of mounting a bank of spray nozzles in the scrubber;

FIG. 5 is a detail transverse sectional view taken along line 5—5 of FIG. 4 and illustrating the construction of one of the spray nozzles;

FIG. 6 is a detail top view, partly in plan and partly in section, looking in the direction of the arrows 6—6 of FIG. 3 and illustrating the construnction of impingement baffles associated with the sprays of the scrubbers, in a first embodiment; and FIG. 7 is a view similar to FIG. 6 and illustrating the baffles in a second embodiment.

Turning to FIG. 1 illustrating schematically the flow in part of the chemical recovery system of a kraft mill incorporating the presently described apparatus:

Kraft black liquor derived from the digester and evaporators is stored in black liquor storage receiver 10. As required, it is pumped through line 12 to a steam atomized venturi scrubber 16 which feeds cyclone separator 14. A recycle line 18 feeds additional black liquor to the venturi scrubber.

The combustion gases from furnace 20 pass in the usual way through venturi scrubber 16 and cyclone separator 14. In these elements of the recovery system, they are scrubbed with a black liquor spray for partial removal of their chemical content. The scrubbed gases then are passed from the cyclone through an exhaust fan 22 and, normally, out stack 24.

The black liquor, fortified by chemicals it has picked up in the cyclone and venturi scrubber, is pumped from the bottom of the cyclone through line 26 into salt cake mix tank 28. Here make-up sodium sulfate is added to it.

The black liquor then is pumped through line 30, heat exchanger 32 and valved line 34 into the burner of furnace 30. Here the usual combustion reactions occur. They result in the collection at the bottom of the furnace of a quantity of smelt containing principally sodium sulfide and sodium carbonate.

The smelt is discharged from the furnace into a smelt dissolving tank 36. Here it is diluted to the desired Baumé, forming green liquor.

As has been explained above, the green liquor is processed for the separation of suspended solids (dregs) which are washed with water to form a weak wash solution containing recovered chemicals. The green liquor then is causticized by the addition of lime. This forms a lime mud which is separated from the resulting white liquor and washed with water to form a further quantity of weak wash.

The weak wash from these two sources is fed through lines 38, 40 respectively to weak wash storage 42. From here it is pumped as required through line 44 to smelt dissolving tank 36. It also is pumped through lines 46 and 47 to the secondary chemical recovery system which is the subject matter of the present invention.

In accordance with the invention, the stack gases from furnace 20, which normally pass through stack 24, are bypassed through a branch conduit 48 and secondary exhaust fan 49 into the afterscrubber, 50. Fan 49 is of sufficient capacity so that substantially all of the furnace gases are diverted from stack 24 and passed to the afterscrubber.

In addition to the usual combustion products of woody materials, the furnace gases contain an appreciable quantity of malodorous hydrogen sulfide and a fine dust of sodium salts, the component particles of which have diameters of the order of 5 microns. Of the total sodium salts about 85% is sodium sulfate; about 15%, sodium carbonate.

The afterscrubber thus serves the dual purpose of removing the hydrogen sulfide so that it is not vented to the atmosphere, creating a nuisance, as well as of recovering the valuable sodium salts and returning them to the plant system.

As illustrated schematically in FIG. 1, afterscrubber 50 comprises a horizontal, rectangular duct thirty or more feet in length. It contains first and second gas scrubbing sections 52, 54, respectively, and communicates tangentially at its outfeed end with a vertical stack 56. The purpose of the tangential introduction of the duct into the stack is to provide a cyclone arrangement which slows down the rate of travel of the scrubbed gases to a speed at which any entrained droplets of liquid will fall out, or be collected on the stack walls.

A sump 58 follows spray unit 52; a sump 60, spray unit 54. A third sump 62 is located at the bottom of stack 56.

The overflow from the sumps is collected in V-notched weirs 64, 66, 68, respectively which pass the liquid through lines 70, 72, 74, respectively, to a common line 76 which returns it to weak wash storage tank 42. If desired, liquor returned from the sumps via common line 76 may be cycled directly through branch line 77 to smelt dissolving tank 36.

Sumps 58, 60 additionally serve as head boxes to feed spray units 52, 54, respectively. Thus liquor collected in sump 58 may be pumped via valved lines 78 and 46 to spray unit 52. Liquor collected in sump 60 may be pumped through lines 80, 47 to spray unit 54. Liquor collected in sump 62 may be returned to sump 60 through valved line 80. Bypass lines 82, 84, and 80 are provided for level control between sumps 58, 60 and 62.

Further to control and equalize the flow of liquor through the washing units, there may be provided a valve bypass lines 86 which mixes fresh liquor with liquor from sump 58 and pumps it through lines 78 and 46 respectively. There is also a valved bypassed line 88 which mixes additional fresh liquor with the liquor from sump 60 and pumps it through lines 89 and 47 respectively to spray showers 54.

As indicated above, the effluent gases from the furnace are drawn by fan 49 into the upstream end of the afterscrubber. They pass successively through scrubbing units 52, 54 and then are introduced tangentially into stack 56. The construction of both of the two scrubbing units is substantially identical. It is illustrated in FIGS. 2-7.

Basically, each scrubbing unit comprises a spray assembly positioned to spray downstream and arranged a predetermined distance upstream from an assembly of impingement baffles. The spray assembly includes a group of spray headers positioned in spaced vertical relation to each other, each header carrying a group of horizontally spaced spray nozzles.

The construction of all of the headers is substantially identical. Each includes a conduit 90 branching from pipe 47 and fitted with a hand valve 92. The purpose of the valve is to divide the flow of wash liquor between the various headers as required to equalize the flow as well as to flush out a given header which may have become plugged. Thus where a plugging problem has arisen, all of valves 92 may be turned off with the exception of that controlling the flow through the plugged line. This applies maximum pressure to the latter, freeing the nozzles mounted upon it from clogging deposits.

To enable removal of the headers for cleaning and repair, they are coupled to branch lines 90 by means of a coupling 94, FIG. 4. Coupling 94 couples branch line 90 to header pipe 96. The header pipe is provided with a flange 98 which may be bolted to a companion flange 100 fixed to the outer margin of a stub conduit 102 extending laterally from the side wall of the afterscrubber.

The end of header pipe 96 remote from flange 98 is unsupported. Hence by releasing the bolts which hold together flanges 98 and 100, and uncoupling coupling 94, each header pipe may be removed separately from the scrubbing unit.

Each header pipe is formed with a plurality of horizontally spaced, upwardly directed openings 104, FIG. 5. A spray head 106 of suitable design is threaded into each opening. The spray head is arranged to spray the washing liquor in the downstream direction, the spray from each head overlapping the sprays of adjacent heads to achieve maximum scrubbing efficiency.

The sprays are directed onto a set of impingement baffles placed downstream from the spray heads but upstream from the sump associated with the spray unit. A door 108 is hinged to the side of the duct 50 for servicing and cleaning the baffles.

The impingement baffles, may be provided in alternate forms, two of which are illustrated in FIGS. 6 and 7. They are arranged vertically at spaced intervals along a horizontal row alternating with spray heads 106. Each baffle is fixed suitably, as by welding, to the top and bottom of the duct.

In the FIGS. 3 and 6 form of the invention, each baffle 110 is a composite of two vertical sections 110a and 110b. The two sections are arranged at an appropriate angle to each other such that the spray will impinge upon the baffle, causing a turbulence which assists in the scrubbing of the gas and also providing a surface for guiding the scrubbing liquid downwardly to the floor of the duct where it collects in sump 60. To achieve this purpose section 110a of each baffle is arranged in a plane parallel to the direction of gas flow while section 110b is arranged at an angle thereto.

In the form of the invention illustrated in FIG. 7, each baffle unit 112 comprises a leading terminal segment 112a, a central rib 112b and a trailing terminal segment 112c. Terminal sections 112a, 112c are arranged parallel to the direction of gas flow while the segments defining central rib 112b are arranged at an angle thereto, thereby assuring the generation of turbulence while providing a guiding surface to guide the impinged liquor downwardly.

The operating conditions prevailing within the afterscrubber are adjustable within limits as required for most efficient operation.

Thus the temperature may vary within the broad range of from 150–400° F., specifically from 160–200° F.

The pressure within the afterscrubber may vary from −2 to +10 inches of water, specifically from −2 to +4 inches of water.

The velocity of gas flow through the afterscrubber may vary broadly from 1–100 feet per second, specifically from 10–60 feet per second.

The contact time of the gas with the spray liquid may vary in general from 0.5–5 seconds, specifically from 1–3 seconds.

The ratio of scrub solution to stack gas may vary within the broad range of from 3–15 gallons of recycled scrub solution drawn from the sump, plus from 1–5 gallons of make-up scrub solution drawn from the weak wash storage tank per 1000 cubic feet of gas. In a specific instance, the scrub solution to stack gas ratio may be 6 gallons of recycled solution and a ½ gallon of make up scrub solution, per 1000 cubic feet of stack gas.

The pH of the washing liquor may vary from pH 10 to pH 14 where the recovery of sulfide is the primary objective; from 5–10 where the recovery of sodium salts is the primary objective. Where, as is usually the case, it is desirable to collect both with maximum efficiency, the pH of the washing liquor may range from pH 9 to pH 13.

The manner of application of the herein described chemical recovery and odor abatement apparatus is illustrated in the following example.

EXAMPLE

Stack gases emanating from the cyclone separator receiving the gaseous effluent from a kraft pulp mill recovery furnace were passed through a horizontally arranged afterscrubber of the type illustrated in FIG. 2. In addition to the usual products resulting from the combustion of organic material, the combustion gases contained gaseous hydrogen sulfide and small solid particles of sodium sulfide and sodium carbonate.

The temperature within the afterscrubber was 170–190° F. The pressure was −1 to +4 inches of water. The gas velocity was adjusted to a value of from 10 to 60 feet per second. The contact time of the gases with the spray was from 1–3 seconds. The pH of the scrubbing solution was from 10–14. The scrubbed solution to stack gas ratio was 6 gallons per 1000 cubic feet of gas (recycle solution) and 2½ gallons per 1000 cubic feet of gas (make-up solution).

During the tests the gases leaving the afterscrubber were tested for hydrogen sulfide using the standard zinc acetate colorimetric test. Sodium salt collection efficiencies were determined by sampling inlet and outlet gas streams and determining their concentrations on a flame spectrophotometer. They also were determined by testing for sulfate ions turbidimetrically. Sodium salt samples were taken as close to isokinetic conditions as possible.

Three separate scrubbing liquids were passed through the unit to test the relative efficiencies: (1) water (2) 25% caustic soda solution and (3) weak wash from the mill. The results of the tests are summarized below:

| Scrubbing medium | Percent recovery | |
|---|---|---|
| | Hydrogen sulfide | Sodium salts (sodium sulfate) |
| Water | (¹) | 60 |
| 25% caustic soda solution | 40 | 28 |
| Weak wash | 90 | 50 |

¹ No recovery.

It thus will be apparent that by the present invention there has been provided a process for the recovery of chemicals and abatement of odor emitted by a kraft pulp mill recovery furnace, characterized by significant advantages. It recovers the pulping chemicals efficiently and returns them to the plant streams without upsetting material balances or introducing harmful components. It reduces by a substantial amount the proportion of odorous hydrogen sulfide contained in the stack gases.

The apparatus may be installed in the mill without serious adjustment or modification of the other apparatus components. It is not necessary to use a special scrubbing liquor since liquor already available in the mill may be employed. Heat which otherwise would be dissipated through the stack is recovered. The apparatus accordingly may be applied with both economic and practical advantage to existing kraft pulping mills.

Having thus described my invention in preferred embodiments, I claim as new and desire to protect by Letters Patent:

1. In a kraft pulp mill having storage means for black liquor resulting from the cooking of lignocellulose, a recovery furnace communicating with the black liquor storage means for concentrating and burning black liquor, a discharge stack communicating with the recovery furnace for discharging stack gases from the latter to the atmosphere, smelt dissolving means communicating with the recovery furnace for receiving and dissolving smelt from the recovery furnace to form green liquor, and storage means for alkaline weak wash liquor resulting from the washing of calcium carbonate mud and solid dregs produced by causticizing green liquor, the combination therewith of stack gas scrubbing means, comprising:
 (a) bypass conduit means communicating at one end with the discharge stack for diverting furnace gases from the discharge stack,
 (b) a vent stack for venting gases to the atmosphere,
 (c) a substantially horizontal afterscrubber duct communicating at its upstream end with the bypass conduit means and at its downstream end with the vent stack,
 (d) spray means mounted in the duct for spraying an aqueous liquid into the gases,
 (e) conduit means communicating the spray means with the alkaline weak wash liquor storage means for delivering said liquor to the spray means,
 (f) impingement baffle means mounted in the duct a spaced distance from the spray means, positioned for intercepting the spray thereof, and
 (g) sump means in the bottom of the duct below the baffle means for collecting the spray liquid intercepted thereby.

2. The combination of claim 1 including fan means adjacent the bypass conduit means for diverting a substantial proportion of gases in the discharge stack to the afterscrubber duct.

3. The combination of claim 1 including conduit means communicating the sump means with the alkaline weak wash liquor storage means for returning collected liquor to the latter.

4. The combination of claim 1 including conduit means communicating the sump means with the smelt dissolving means for returning collected liquor to the latter.

5. The combination of claim 1 wherein the downstream end of the duct communicates tangentially with the vent stack for reducing the gas velocity thereon.

6. The combination of claim 1 wherein the spray means comprises a plurality of vertically spaced, horizontally arranged pipes communicating with the alkaline weak wash liquor storage means, each pipe being provided with a plurality of spaced spray heads, and mounting means for mounting each pipe to a side wall of the duct.

7. The combination of claim 1 wherein the baffle means comprises a plurality of horizontally spaced, vertically arranged baffles secured to the top and bottom of the duct.

8. In a kraft pulp mill having storage means for black liquor resulting from the cooking of lignocellulose, a recovery furnace communicating with the black liquor storage means for concentrating and burning black liquor, a discharge stack communicating with the recovery furnace for discharging stack gases from the latter to the atmosphere, smelt dissolving means communicating with the recovery furnace for receiving and dissolving smelt from the recovery furnace to form green liquor, and storage means for alkaline weak wash liquor resulting from the washing of calcium carbonate mud and solid dregs produced by causticizing green liquor, the combination therewith of stack gas scrubbing means, comprising:
  (a) bypass conduit means communicating at one end with the discharge stack for diverting furnace gases from the discharge stack,
  (b) a vent stack for venting gases to the atmosphere,
  (c) a substantially horizontal afterscrubber duct having open upstream and downstream ends and a top, bottom and two side walls,
  (d) the upstream end of the duct communicating with the bypass conduit means and the downstream end communicating tangentially with the vent stack,
  (e) spray means mounted in the duct for spraying an aqueous liquid into the gases and comprising a plurality of vertically spaced, horizontally arranged pipes communicating with the alkaline weak wash liquor storage means, each pipe being provided with a plurality of spaced spray heads directed in the downstream direction with respect to the gas flow through the duct, and mounting means for mounting each pipe to a side wall of the duct, the mounting means comprising a flanged stub conduit extending outwardly from the side of the duct and a flange mounted on each pipe and means for securing the flanges together thereby removably mounting the pipe,
  (f) impingement baffle means mounted in the duct a spaced distance from the spray means, positioned for intercepting the spray thereof, the baffle means comprising a plurality of horizontally spaced vertically arranged baffles secured to the top and bottom of the duct, each baffle comprising leading intermediate and trailing vertical sections, the leading and trailing vertical sections being arranged substantially parallel to the direction of gas flow and the intermediate section being formed as a rib projecting at an angle to the direction of gas flow, and
  (g) sump means in the bottom of the duct below the baffle means for collecting the spray liquid intercepted thereby.

References Cited

UNITED STATES PATENTS

| | | | |
|---|---|---|---|
| 808,897 | 1/1906 | Carrier | 55—257 |
| 910,045 | 1/1909 | Donaldson | 55—257 |
| 1,743,554 | 1/1930 | Larkin | 261—115 |
| 1,866,193 | 7/1932 | Coutant | 261—F.G.UX |
| 1,961,956 | 6/1934 | Bleibtreu et al. | 261—F.G.UX |
| 1,978,546 | 10/1934 | McCombie | 55—257 |
| 2,046,500 | 7/1936 | Carter | 23—178 |
| 2,066,832 | 1/1937 | Gay | 55—257X |
| 2,186,125 | 1/1940 | Roberts | 55—257 |
| 2,911,011 | 11/1959 | Niehart | 55—257X |
| 3,006,436 | 10/1961 | Starbuck et al. | 55—257X |
| 3,237,381 | 3/1966 | Hvostoff et al. | 55—89 |
| 3,331,194 | 7/1967 | Reed et al. | 55—235 |

DENNIS E. TALBERT, JR., Primary Examiner

U.S. Cl. X.R.

23—2; 55—229, 237, 257, 316, 385, 443; 162—30; 261—116